(12) United States Patent
Kopparam et al.

(10) Patent No.: US 12,430,416 B2
(45) Date of Patent: Sep. 30, 2025

(54) METHOD AND SYSTEM FOR GENERATING USER INTERFACE ON ELECTRONIC DEVICES

(71) Applicant: Cisco Technology, Inc., San Jose, CA (US)

(72) Inventors: Anusha Kopparam, Fremont, CA (US); Nagendra Kumar Nainar, Morrisville, NC (US); Nahid Alam, San Bruno, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 247 days.

(21) Appl. No.: 18/364,031

(22) Filed: Aug. 2, 2023

(65) Prior Publication Data
US 2025/0045372 A1  Feb. 6, 2025

(51) Int. Cl.
*G06F 21/36* (2013.01)
*G06F 3/04886* (2022.01)

(52) U.S. Cl.
CPC .......... *G06F 21/36* (2013.01); *G06F 3/04886* (2013.01)

(58) Field of Classification Search
CPC ....... G06F 21/36; G06F 3/04886; G09C 1/00; H04L 9/38
See application file for complete search history.

(56) References Cited

U.S. PATENT DOCUMENTS

| 2007/0089164 | A1 | 4/2007 | Gao et al. | |
| 2010/0259561 | A1 | 10/2010 | Forutanpour et al. | |
| 2012/0313858 | A1* | 12/2012 | Park | G06F 3/018 345/171 |
| 2013/0234942 | A1* | 9/2013 | Yoo | G06F 1/1673 345/168 |
| 2017/0003876 | A1* | 1/2017 | Marsden | G06F 3/0231 |
| 2017/0185807 | A1 | 6/2017 | Dow et al. | |
| 2020/0143345 | A1 | 5/2020 | Adams et al. | |

(Continued)

FOREIGN PATENT DOCUMENTS

WO  2012009334 A1  1/2012

OTHER PUBLICATIONS

International Search Report and Written Opinion for International Application No. PCT/US2024/038938, mailed Sep. 24, 2024, 16 Pages.

(Continued)

*Primary Examiner* — Hany S. Gadalla
(74) *Attorney, Agent, or Firm* — Baker Botts L.L.P.

(57) ABSTRACT

Embodiments relate to a method and an electronic device for modifying a user interface of the electronic device. The method includes detecting, on the electronic device, a selection of a multi-keypad configuration among a plurality of multi-keypad configurations. Based on the selection of the multi-keypad configuration, a plurality of virtual keys are displayed on the user interface. The method includes receiving, on the user interface, a user touch gestures to configure one or more of the plurality of virtual keys to generate a virtual keyboard. The method includes updating machine learning models, image classifier models, and memory of the electronic device to update and store the generated virtual keyboard including the configuration of the one or more of the plurality of virtual keys to initiate user authentication in real time.

19 Claims, 13 Drawing Sheets

(56) References Cited

U.S. PATENT DOCUMENTS

2020/0349250 A1* 11/2020 Marzorati ............ H04L 9/3226
2021/0294887 A1 9/2021 Pike

OTHER PUBLICATIONS

Varma M., et al., "VibroAuth: Authentication with Haptics Based Non-Visual, Rearranged Keypads to Mitigate Shoulder Surfing Attacks", Springer Link, Jun. 16, 2022, pp. 280-303, XP047625436, 24 Pages, Retrieved on Jun. 16, 2022, Abstract, Paragraph [Section4. 2]-Paragraph [Section4.4].

* cited by examiner

Trackpad

Mobile phone screen

Trackpad representation on the screen

Trackpad

Trackpad with 2 spaced vibrations

View through smart glass during configuration step.

View through smart glass. AR overlay of numbers showing KeyPad-2.

METHOD AND SYSTEM FOR GENERATING USER INTERFACE ON ELECTRONIC DEVICES

TECHNICAL FIELD

The present disclosure relates generally to multi-factor authentication and more particularly, to methods, devices, and computer-readable media for generating user interfaces on the devices.

BACKGROUND

In general, there are many applications and resources today that require some form of multi-factor authentication or authentication by entering personal identification numbers (PIN numbers). Most online bank transactions require users to log in to their bank account by entering their user identification (ID) which is a set of numbers or enter credit card details which are again purely numbers. As an example, smartphones contain a lot of personal information related to their owners and more than 80% of smartphones are protected through numerical pins.

These are some of the instances which require users to enter numbers to authenticate themselves to use resources/applications or transact online. All this sensitive information is prone to observational attacks (shoulder surfers and camera recording can easily look and get away with sensitive information), smudge attacks (often touch screens or trackpads after use leave behind smudges after usage), and thermal attacks (touches leave behind thermal signature which can be used to guess what was entered).

Multi-factor/number-based authentication is a well-tested secure authentication form; however, the way users input their details to authenticate themselves is prone to many easy attacks.

One of the conventional approaches involves haptic lock techniques, which use non-visual interaction modalities for discreet PIN entry making it robust to attacks by shoulder surfing. But the haptic method of input can become confusing to the users in scenarios where users must input large numbers like credit card details.

Another conventional approach includes illusion PIN entries which is another method trying to solve the leak of information through shoulder surfing by using hybrid images to blend two keypads with different digit orderings. The users see different keypads based on their distance from the device, making it hard for shoulder surfers to guess the PIN. For each login new hybrid images are generated. However, this solution only works for mobile devices and fails to be applicable to laptops or devices that use trackpads.

In an era where the user is being watched (shoulder surfers and omnipresent cameras), no PINs or passwords or data input to authenticate or carry out online transactions is safe from observational attacks.

DETAILED DESCRIPTION

Overview

Figure 1:
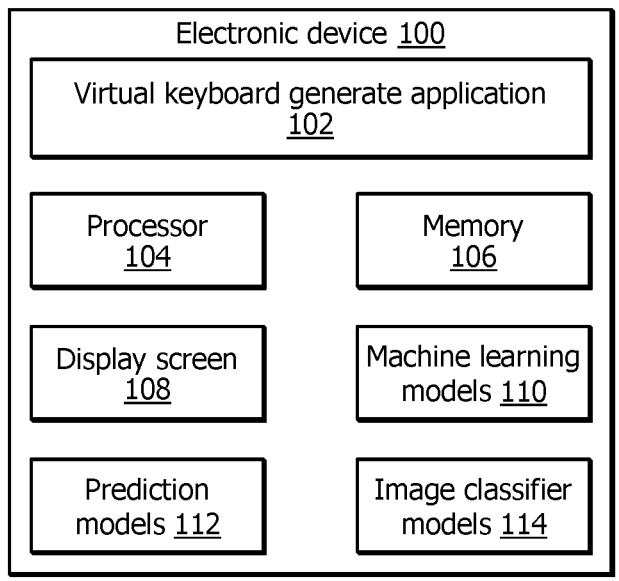
FIG. 1 illustrates an example of an electronic device integrated and/or installed with a multi factor keyboard generation application, according to an embodiment.

Embodiments of the present disclosure relate to a method implemented by an electronic device to modify a user interface of the device. The method includes detecting a selection of a multi-keypad configuration among a plurality of multi-keypad configurations provided on the electronic device. Based on the selection of the multi-keypad configuration among the plurality of multi-keypad configurations, a plurality of virtual keys may be displayed on the user interface. The method then includes receiving a user touch gestures on the user interface to configure one or more of the plurality of virtual keys to generate a virtual keyboard. The virtual keyboard that is being generated including the configuration of the one or more of the plurality of virtual keys may be detected and memory of the electronic device may be updated with the virtual keyboard to initiate user authentication according to the virtual keyboard during real-time usage, for example, authenticating a user of the device.

Embodiments of the present disclosure relate to a computer system that includes a user interface, one or more processors, memory, and one or more computer-readable non-transitory storage media that may be in communication with the one or more processors. The non-transitory storage media comprises instructions that when executed by the one or more processors cause the computer system to perform one or more operations. The computer system may be configured to detect a selection of a multi-keypad configuration among a plurality of multi-keypad configurations that may be displayed on the user interface for user selection. The system may be configured to display a plurality of virtual keys on the user interface based on the selection of the multi-keypad configuration. The system may be configured to receive, on the user interface, a user touch gestures to configure one or more of the plurality of virtual keys to generate a virtual keyboard. The virtual keyboard that is being generated including the configuration of the one or more of the plurality of virtual keys may be detected. The memory of the computer system may be updated with the virtual keyboard to initiate user authentication according to the virtual keyboard during real-time usage, for example, authenticating a user of the computer system.

Embodiments of the present disclosure relate to one or more computer-readable non-transitory storage media including instructions that, when executed by one or more processors of a computer system, are configured to cause the one or more processors to perform one or more operations. The processors may be configured to detect, on the computer system, a selection of a multi-keypad configuration among a plurality of multi-keypad configurations. The processors may be configured to display a plurality of virtual keys on the user interface based on the selection of the multi-keypad configuration. The processors may be configured to receive, on the user interface, a user touch gestures to configure one or more of the plurality of virtual keys to generate a virtual keyboard. The processors may be configured to detect the generated virtual keyboard including the configuration of the one or more of the plurality of virtual keys. The processors may be configured to update memory of the computer system with the virtual keyboard to initiate user authentication according to the virtual keyboard.

Embodiments of the present disclosure relate to a method performed on an augmented reality (AR) device associated with a computing system. In an embodiment, the computing system may implement functions or operations of the computer system described above for configuring the multi-keypad configurations. The AR device may be used to provide AR gestures for configuring the multi-keypad configurations and inputting authentication keys during the authentication process. The method includes detecting one or more AR gestures for selecting a multi-keypad configuration among a plurality of multi-keypad configurations. Based on the selection of the multi-keypad configuration, a plurality of virtual keys may be displayed on a user interface of the computing system. The method includes determining a spatial distribution of each virtual key on the user interface. The spatial distribution of each virtual key on the user interface may be mapped to a display screen of the AR device. Based on the mapping, the plurality of virtual keys may be displayed on the display screen of the AR device. The method then includes determining a gaze of a user (of the user's eyes) at a region of interest corresponding to one or more of the plurality of virtual keys on the display screen of the AR device. The method performs detection of AR configuring inputs (user AR gestures) to configure the one or more of the plurality of virtual keys to generate a virtual keyboard. The virtual keyboard that is being generated including the configuration of the one or more of the plurality of virtual keys may be detected. The virtual keyboard including the configuration of the one or more of the plurality of virtual keys may be updated to memory associated with the AR device and a database of the computing system to initiate user authentication according to the virtual keyboard.

The embodiments recognize the existing challenges related to authentication processes that require the users to enter sensitive information, for example, passcode, passwords, PIN numbers, that are prone to observational attacks, smudge attacks and thermal attacks. Also, existing challenges are related to multi-factor or number-based authentication processes requiring the user to input sensitive information and details associated with many easy attacks.

To solve the existing challenges, the embodiments of the present disclosure provide computer-implemented techniques to configure multiple keypad configurations to enable the users to input sensitive information in any form during configuration and authentication. The present disclosure solves the problem for users of both laptops or desktops (with the trackpad) and smartphones to perform authentication operations using any of the configured multiple keypad configurations via tactile force, image classifiers and augmented reality (AR) techniques. The present disclosure provides a technical advantage of configuring multiple keypad configurations enabling the users to configure a user interface (screen) of any device (for example, laptop, desktop, mobile phone screens) with any form of keypad with any number in any form without being restricted to use particular set or sequence or arrangement. For example, the user interface may be customizable with any number of authentication keys and numbers and/or alphanumeric characters by the users as per users' comfort. The present disclosure also provides a technical advantage of using previously configured keypad configurations during real-time authentication steps which overcomes all the observational attacks. In exemplary embodiments, the present disclosure enables the users to input their PIN details or credit card details or any form of numbers to authenticate or authorize themselves to use resources or devices or applications or transact online services securely without being prone to observational attacks. Embodiments of the present disclosure provide advanced users, for example, smart glass users and AR users to configure multiple keypad configurations and to input sensitive information via AR gestures that solves the existing challenges of several attacks.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In an era where a user is being watched, for example, attackers watch the user through shoulder surfers, omnipresent cameras, etc., no PINs or passwords or data the users input to authenticate or do online transactions is safe from observational attacks. There is a need to develop a technique for users using electronic devices (for example, laptops, desktops, mobile phones) and/or advanced users using AR devices to generate and/or customize multiple keypad configurations with any number of keypads and assign numbers/digits/characters (alphanumeric characters) in any form to any of the keypads without being restricted to using the standardized format that current devices are controlled. In this way, the present disclosure allows the user to customize the method of inputting sensitive information according to the user's comfort. For example, the user may input sensitive information for authentication/authorization using touch/tactile force on mobile phones and/or AR gestures on AR devices which not only keeps the user safe from observational attacks but also adapts to the user's behavior based on their usage.

Embodiments of the present disclosure may be related to electronic devices and methods that implement a device application to generate multiple keypad configurations. The multiple keypad configurations may be associated with different ways of setting a user interface of a device with keypads and numbers (along with alphanumeric characters) as passwords or PINs or keys or any personal sensitive information for the authentication process. After configuring the user interface of the electronic device with particular settings, the user may be guided to input the sensitive information for a real-time authentication process using previously configured particular settings. For example, embodiments relate to a solution that allows users to input their pins, credit card details or any form of numbers, and passwords to authenticate or authorize themselves to use resources, devices, and applications, and transact online securely without being prone to attacks.

Embodiments provide a method implemented on the electronic device (or a computer system) using the device application to configure multi-keypad configurations. For example, the user may configure a plurality of multi-keypad configurations different from one another. Most existing devices restrict the user to configure only one such way to enter the password, passcode, or sensitive information for authentication/authorization purposes. In a configuration step, the user may choose one of the multi-keypad configuration options. Based on the selection of a multi-keypad configuration option, the user interface, for example, a trackpad in a laptop/desktop or a phone screen in a smartphone, may be divided into a plurality of regions. Each region represents a boundary or an area essentially providing a touch-sensitive area, configurable area, and/or gesture capture region on the user interface where the user may provide user-touch gestures and/or user-input gestures. For example, each region may be represented with a dot, an identifier and a text box. The text box provides a way through which the user may assign virtual keys, for example, numbers, digits and/or alphanumeric characters. The user may select any number of regions (for example, two or four or seven or ten regions or any number of regions) and assign any key to any region. This enables the user to customize the user interface including the trackpad/keypad and/or phone screen in any form according to a user's comfort and ease. Once the configuration is complete, a virtual keyboard may be generated and stored/updated in memory of the electronic device (or the computer system). Using the configuration step, the user may set two or more multi-keypad configurations different from one another and store each multi-keypad configuration in the memory. During the real-time authentication process, the user can select any of the stored multi-keypad configurations and enter authentication keys according to the corresponding virtual keyboard that was previously set and generated for a particular multi-keypad configuration.

Embodiments of the present disclosure relate to a real-time authentication process using any of the multi-keypad configurations of the electronic device (or the computer system). Once the configuration is complete, the user may provide user input gestures (for example, tactile force or vibrations) by touching any of the regions on the user interface to enter authentication keys. For example, the number of vibrations of the user input gestures indicate the number chosen or entered as an authentication key. This ensures the user knows the number or authentication key the user may be entering. The real-time authentication process may include determining whether the authentication keys being entered match the one or more of the virtual keys used for generating the virtual keyboard during the configuration step. If the authentication keys match the one or more of the virtual keys of the virtual keyboard, the user may be authenticated and provided access to the electronic device or the computer system or any applications or transact online operations.

Embodiments of the present disclosure relate to deep learning models, machine learning models, predictive models, and image classifier models that may be pre-trained to provide multi-keypad configuration options to set or configure multiple keypad configurations different from one another. The user may set or configure keypad configuration or perform configuration steps to configure keypad configuration at any point in time. The deep learning models and machine learning models may be pre-trained and trained over time, based on one or more factors including, but not limited to, user input gestures, each time a user is authenticated, user intent for configuring the multi-keypad configuration, a time and period the user may be configuring and/or performing authentication process, user intent and context for authenticating, and regions/area the user may be inputting as user input gesture and/or user touch gestures. The deep learning models and machine learning models may be trained dynamically over time, periodically in different intervals, in real time and/or according to user's interactions automatically.

Embodiments may utilize trained predictive models and image classifier models in predicting the regions the user may be inputting most times to predict the kind of configuration options among the multiple keypad configurations, and the numbers the user entered based on a prediction of spatial placement of the regions (dots) on the user interface. On-device image classifier models and prediction models, user touch gestures and user input gestures may be learned automatically and dynamically to train and improve the models (including the machine learning models, predictive models, and image classifier models) to determine region boundaries for receiving and detecting user input/touch gestures in a better way.

Embodiments of the present disclosure relate to AR devices, AR components, AR systems implementing the device applications, and/or AR-specific applications that allow the user to input sensitive information for authentication/authorization using AR gestures while keeping the user safe from observational attacks and learn the user's behavior/gestures, intent and context of using the authentication. The present disclosure provides a method of configuring multi-keypad configurations using AR devices that may be associated with a computing system. For example, the computing system may implement functions or operations of the electronic device or the computer system for configuring the multi-keypad configurations. In a configuration step, AR gestures from a wearer of the AR device may be detected to select a multi-keypad configuration to configure multi-keypad configuration. Based on the selection of a multi-keypad configuration option, the user interface of the computing system for example, a trackpad in a laptop/desktop or a phone screen in a smartphone may be divided into a plurality of regions and displays a plurality of virtual keys. Each region may be represented with a dot, an identifier and a text box. The text box provides a way through which the user may be enabled to assign virtual keys, for example, numbers, digits and/or alphanumeric characters. The user may select any number of regions (for example, two or four or seven or ten regions or any number of regions) and assign any virtual key to any region. For example, the user may either gaze to select the regions or touch the regions corresponding to the number the user wants to enter. The regions including the dots, identifiers and text boxes may be overlaid and visible only through the AR device (smart glasses or AR headsets) to provide configuration and authentication processes more securely. For example, in the configuration step, the users may look around to see the spatial distribution of the dots on the trackpad of the laptop device and mobile phone screen. The spatial distribution of each virtual key on the user interface may be mapped to a display screen of the AR device. Based on the mapping, the plurality of virtual keys may be displayed on the display screen of the AR device. Using the user AR gestures, for example, gaze functionality that may be provided by most AR headsets, users gaze at a region to select a region and activate the corresponding text box. Once the text box is selected, the user may provide configuring inputs to assign the required virtual key, for example, some number and/or alphanumeric characters and a combination thereof. Based on the configuration of the one or more of the plurality of virtual keys, a virtual keyboard may be generated and the form of the virtual keyboard may be visible via only the AR device. The virtual keyboard that is being generated includes the configuration of the one or more of the plurality of virtual keys that may be detected. The virtual keyboard, including the configuration of the one or more of the plurality of virtual keys, may be updated to memory associated with the AR device and a database of the computing system to initiate user authentication according to the virtual keyboard.

Embodiments of the present disclosure relate to the real-time authentication process using the AR device. Once the configuration is complete, the user interface of the computing system may be mapped to the display screen of the AR device. The user may provide user AR gestures (for example, gaze or blink gestures or head gestures or finger taps) to enter authentication keys. For example, finger taps, as the user configuring inputs, indicate scroll movement for choosing the number and entering as the authentication key. The real-time authentication process may include determining whether the authentication keys being entered match the one or more of the virtual keys used for generating the virtual keyboard during the configuration step. If the authentication keys match the one or more of the virtual keys of the virtual keyboard, the user may be authenticated and provided access to the computer system or any applications or transact online operations.

Embodiments of the present disclosure relate to deep learning models, machine learning models, predictive models, and image classifier models that may be pre-trained to provide multi-keypad configuration options to set or configure multiple keypad configurations different from one another. The user may set or configure keypad configuration or perform configuration steps to configure keypad configuration at any point in time through AR gestures or AR gesture inputs. The deep learning models and machine learning models may be pre-trained and trained over time, based on one or more factors including, but not limited to, user AR gestures, each time user is authenticated via the AR device gestures, possible AR gestures that may be performed by the user, user intent for configuring the multi-keypad configuration, time and period the user may be configuring and/or performing authentication process, user intent and context for authenticating and regions/area the user may be looking at or gazing. The deep learning models and machine learning models may be trained dynamically over time, periodically in different intervals, in real-time and/or according to user interactions automatically.

Embodiments may utilize trained predictive models and image classifier models in predicting the regions the user may be gazing at or looking at or defining the region of interest to predict the kind of configuration options among the multiple keypad configurations, numbers the user entered based on a prediction of spatial placement of the regions (dots) on the user interface. On-device image classifier models and prediction models, the user AR gestures, user configuring inputs via the AR device may be learned automatically and dynamically to train and improve the models (including the machine learning models, predictive models, and image classifier models) to determine the user gaze, region of interest and the region boundaries for user AR gestures in better way.

The embodiments disclosed herein are only examples, and the scope of this disclosure is not limited to them. Particular embodiments may include all, some, or none of the components, elements, features, functions, operations, or steps of the embodiments disclosed herein. Embodiments according to the present disclosure are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1 illustrates an example of an electronic device 100 integrated and/or installed with a virtual (multi-factor or multi-keypad) keyboard generate application 102, according to an embodiment. In an embodiment, the electronic device 100 may comprise any kind of computing device such as a desktop computer, computer system, computing system, laptop computer, tablet computer, mobile computing device, smartphone, personal computers, personal digital assistants (PDAs), laptops, or workstations, notebook, netbook, tablet computer, e-book reader, GPS device, camera, personal digital assistant (PDA), handheld electronic device, cellular telephone, smartphone, augmented/virtual reality (AR/VR) device, mixed reality (MR) device, other suitable electronic devices, or any suitable combination thereof. In some embodiments, the electronic device 100 may comprise an AR device including, but not limited to, a head-mounted display device (HMD), an electromyographic wearable device (EMG), a head-up display device (HUD), AR glasses (smart glasses), smartphone AR (mobile AR), tethered AR headsets and any other devices with AR features. In an embodiment, each of the electronic device 100, including the AR device, may be operated or worn by a user. Throughout this disclosure, all references to "user" or "users" are specified for convenience but correspond to virtual keyboard generate application and/or the electronic device that execute the technical steps described in the disclosure. Thus, even where the terms "user" or "users" appear, all steps and functions of the disclosure are intended as computer-implemented steps or technical steps and not manual, mental, human-performed, or abstract steps, each of which is hereby expressly excluded from the scope of the claims and the disclosure.

In an embodiment, the electronic device 100 may comprise one or more processors 104 to implement computer-executable instructions that are stored in one or more memory 106 or memory units, of the electronic device 100. In an embodiment, the AR device may comprise the one or more processors that may be configured to implement each and every functionality of the AR device functionalities, VR device functionalities, and mixed reality (MR) device functionalities.

In an embodiment, the electronic device 100 may be associated with memory 106 to store the virtual keyboard generate application 102 and instructions to execute the virtual keyboard generate application 102. The memory 106 may store instructions to perform configurations for the multi-keypad configurations and authentication process in real-time. The memory 106 may be configured to store multi-keypad configurations (settings or options), user gesture-spaced vibrations, user input gestures, user input tactile force, user input gestures, user touch gestures, various kinds of virtual keyboards that are configured using the multi-keypad configurations and various virtual keys along with information relating to assignment of virtual keys during the configuration process. The memory 106 may also store AR gestures, AR configuring inputs and other AR-related gestures used during the configuration for the multi-keypad configurations and during the authentication process.

In an embodiment, the electronic device 100 may include a user interface 108 and/or display screen 108. The user interface 108 and/or the display screen 108 may be configured to receive user input gestures, user touch gestures and user gesture-spaced vibrations. In some embodiments, the electronic device 100 may include the user interface 108 being mapped to a display screen of the AR device. The electronic device 100 (for example computing system) along with the user interface 108 may be configured to receive, detect and determine AR gestures, AR configuring inputs and other AR-related gestures from the AR device(s) used during the configuration for the multi-keypad configurations and during the authentication process.

In an embodiment, the electronic device 100 comprises machine learning models 110 and image classifier models 114 that may be pre-trained to configure multi-keypad configurations different from one another. In an embodiment, the machine learning models 110 and image classifier models 114 may be pre-trained and trained over time, based on one or more factors including, but not limited to, user input gestures, each time a user is authenticated, user intent for configuring the multi-keypad configuration, the time and period the user may be configuring and/or performing authentication process, user intent and context for authenticating, and regions/area the user may be inputting as user input gesture and/or user touch gestures. The machine learning models 110 and image classifier models 114 may be trained dynamically over time, periodically in different intervals, in real-time and/or according to user interactions automatically. In an embodiment, the trained machine learning models 110 may present different multi-keypad configurations automatically at different intervals, particular time and day based on usage/access by the user and/or based on explicit user commands for authentication. In an embodiment, the trained image classifier models 114 may improve detect user gesture-spaced vibrations, the user touch gestures, user input gestures match determination between the authentication keys being entered and the virtual keys assigned to the virtual keyboard, user AR gestures, gaze of the user at a region of interest using the AR device, spatial placement of capacitive images corresponding to the user input gestures, region boundaries to determine/predict the authentication keys and one or more regions where the authentication keys are being entered. For example, the image classifier models 114 may include, but are not limited to, AlexNet, VGG-16, ResNet (ResNet-50, ResNet-18 etc.), EfficientNet, and MobileNet.

In an embodiment, the electronic device 100 comprises trained predictive models 112 in predicting the regions the user may be inputting most times to predict the kind of multi-keypad configuration among the multiple keypad configurations, numbers the user entered based on a prediction of spatial placement of the regions (dots) on the user interface. The prediction models 112 may be utilized to learn user touch gestures and user input gestures automatically and dynamically to train and improve the models (including the machine learning models, predictive models, and image classifier models) to determine region boundaries for receiving and detecting user input/touch gestures.

Figure 2:
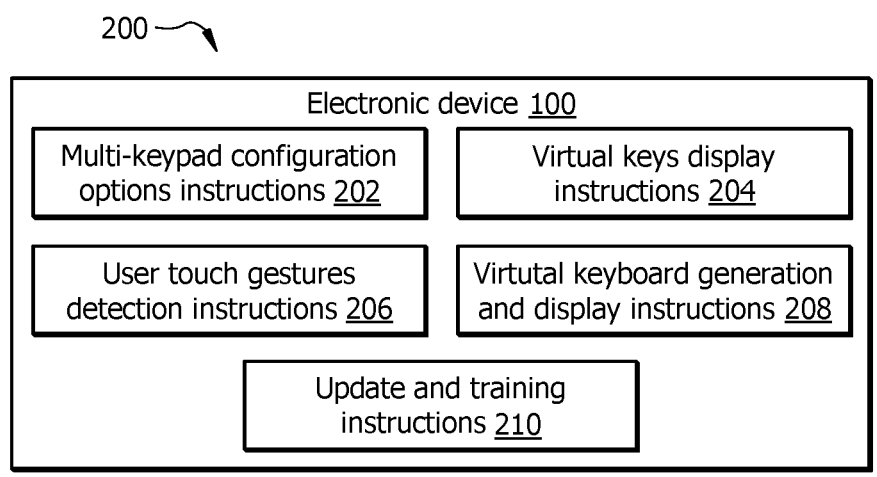
FIG. 2 illustrates various components of an electronic device interoperating with the multi-factor keyboard generation application, according to an embodiment.

FIG. 2 illustrates various components of the electronic device 100 interoperating with the multi-factor keyboard generation application 102, according to an embodiment. In an embodiment, the electronic device 100 comprises computer-executable stored program instructions including, but not limited to, multi-keypad configuration options instructions 202, virtual keys display instructions 204, user touch gestures detection instructions 206, virtual keyboard generation and display instructions 208 and update and training instructions 210.

The multi-keypad configuration options instructions 202 may be programmed to present multi-keypad configurations as options for the user to select and configure. The user may select one or more of the multi-keypad configurations to configure virtual keyboards differently from one another. Each virtual keyboard that is being configured may contain virtual keys being assigned differently as compared to other virtual keyboards with virtual keys. In an embodiment, each multi-keypad configuration may be associated with a user gesture-spaced vibrations. For example, during the authentication process, the user may provide one tap gesture-spaced vibration to activate the first multi-keypad configuration to determine and accept the authentication keys based on the virtual keyboard corresponding to the first multi-keypad configuration. Similarly, the user may provide three tap gesture-spaced vibrations to activate the third multi-keypad configuration to determine and accept the authentication keys based on the virtual keyboard corresponding to the first multi-keypad configuration.

The virtual keys display instructions 204 may be programmed to display a plurality of virtual keys on the user interface 108 based on the selection of the multi-keypad configuration. In an embodiment, the virtual keys may be displayed based on a plurality of regions formed based on division of the user interface 108. Each virtual key may be represented with an identifier, for example dot and user interface widgets, for example, text box to enter a number, character and/or combination thereof.

The user touch gestures detection instructions 206 may be programmed to receive or detect the user touch gesture to configure one or more of the plurality of virtual keys, for example, to assign numbers via the text box. In an embodiment, the user touch gestures detection instructions 206 may be configured to detect user input gestures on the user interface 108 for entering authentication keys, for example, password or passcode. While the user enters the authentication keys, each user input gesture may be represented with vibrations indicating the authentication key being entered.

The virtual keyboard generation and display instructions 208 may be programmed to generate a virtual keyboard. Each virtual keyboard being generated may contain the assignment of virtual keys, for example, the assignment of number, characters and/or combinations thereof.

The update and training instructions 210 may be programmed to update memory 106 of the electronic device 100 with the virtual keyboard that may be utilized to initiate and perform user authentication according to the virtual keyboard. In an embodiment, the update and training instructions 210 may be configured to update and train the image classifier models 114 and region boundaries of the one or more regions of the plurality of regions based on learning the user input gestures various times.

Figure 3:
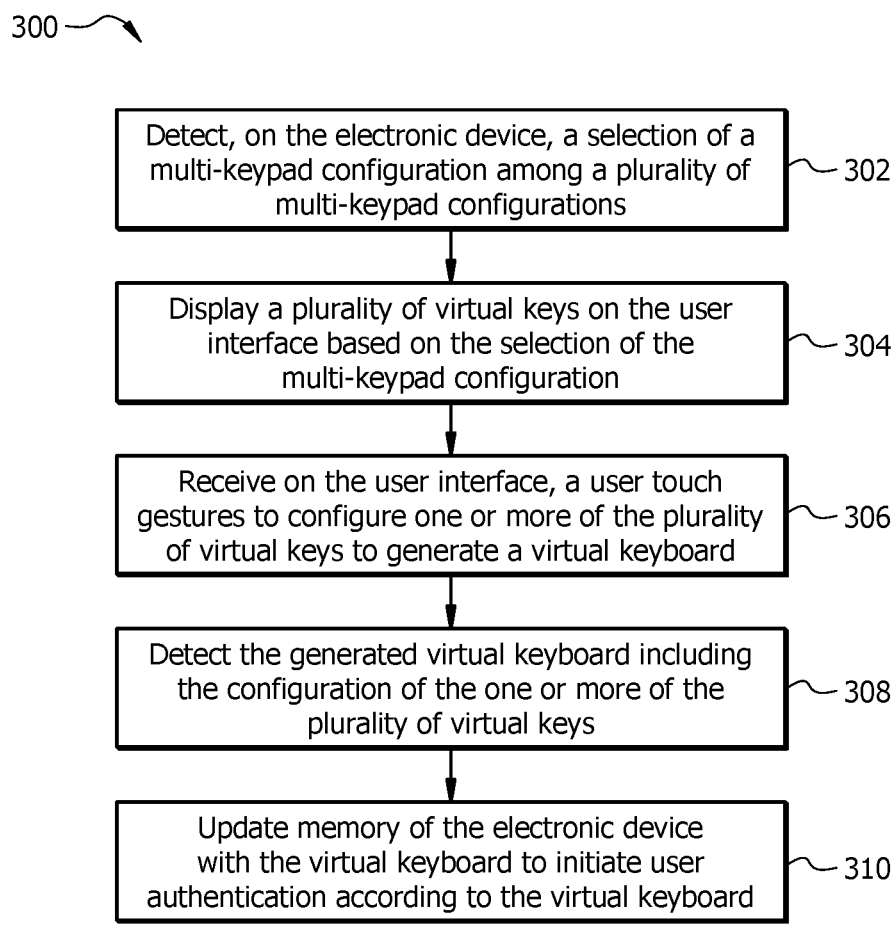
FIG. 3 depicts an example flowchart illustrating a method for modifying a user interface of an electronic device, according to an embodiment.

FIG. 3 depicts an example flowchart illustrating a method for modifying a user interface 108 of the electronic device 100, according to an embodiment. Process 300 describes configuration steps for the user to configure multiple keypad configurations using the virtual keyboard generate application 102, which may be, for example, on-device application that communicates with various device components 104, 106, 110, 112 and 114.

Figure 4A:
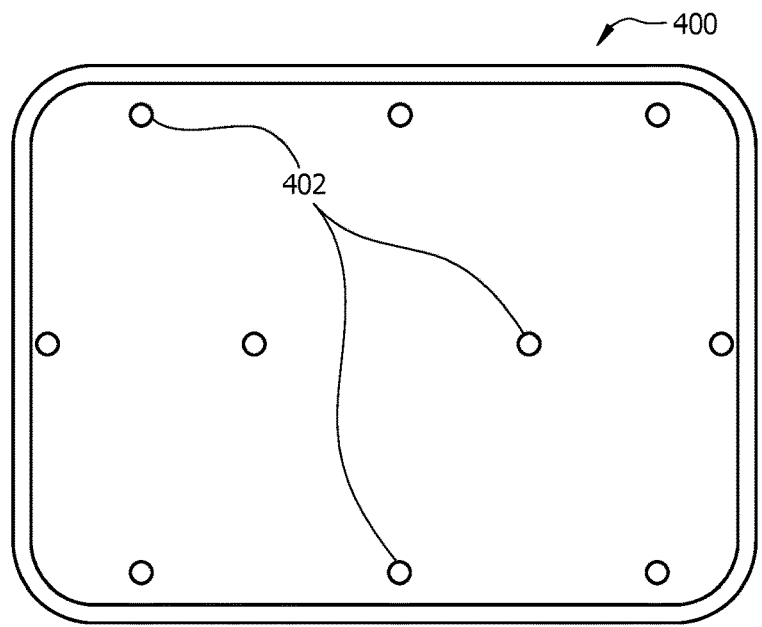
FIG. 4a and FIG. 4b illustrates a user interface of an electronic device having a plurality of regions, according to an embodiment.
Figure 4B:
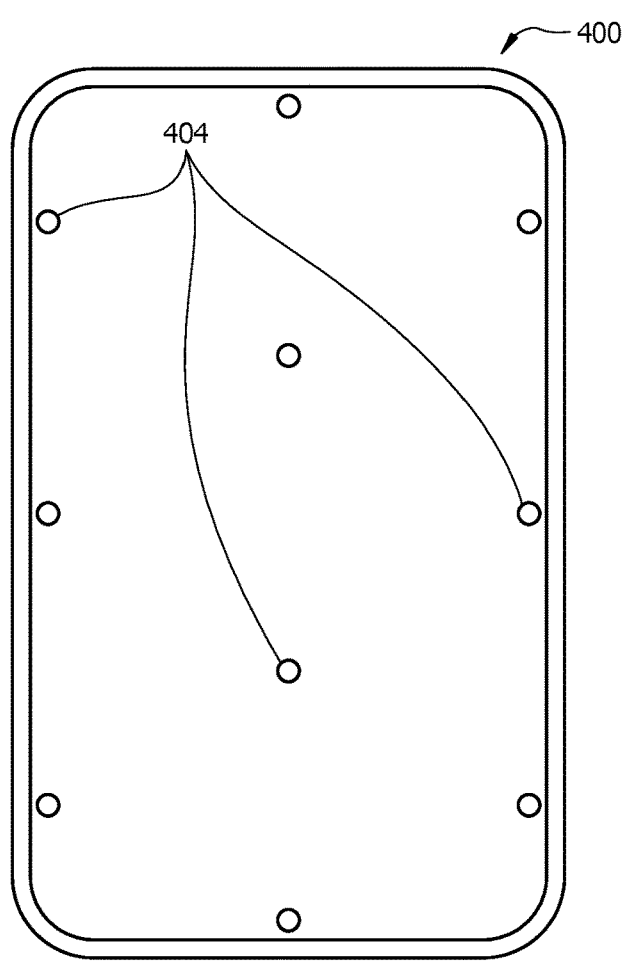

Process 300 begins at step 302 receives and detects a selection of a multi-keypad configuration among various multi-keypad configurations. For example, the on-device application 102 may provide five options of keypad configurations. The user may select each option at a time to configure the keypad or to generate virtual keyboards differently from one another with different keypad configuration options. Assuming the user select one of the multi-keypad configurations. In an embodiment, the selection of the multi-keypad configuration may be detected when the user provides user input including user gesture-spaced vibrations, for example, user touch/tactile force on the user interface 108. In an embodiment, each multi-keypad configuration after being configured with corresponding virtual keyboard may be called upon using user gesture-spaced vibrations. For example, with one tap gesture, first keypad configuration may be activated, and the user needs to input authentication keys, during authentication process (input steps), according to virtual keys set for the first keypad configuration during the configuration steps. Similarly, with two spaced vibrations, a second keypad configuration may be activated, and the user needs to input authentication keys according to virtual keys set for the second keypad configuration for authenticating the user in real time. This process includes dividing the user interface 108 into a plurality of regions based on the detection of selection of the multi-keypad configuration in step 302 and each region may be represented with an identifier. For example, FIG. 4a illustrates the user interface 108 on a trackpad of a laptop/desktop having a plurality of regions 402, and FIG. 4b illustrates a screen of a smartphone having a plurality of regions 404. For example, the trackpad in the case of laptop/desktop in FIG. 4a and the phone screen in the case of smartphone in FIG. 4b may be divided into 10 regions with centers of the regions represented by identifiers, for example, dots. In an embodiment, each region 402, 404 may be bound by a region boundary. In an embodiment, the division of the user interface 108 into the plurality of regions (402, 404) may be according to an orientation of the electronic device 100 (laptop/smartphone). The orientation may include, but are not limited to, a portrait orientation, a landscape orientation, a dual portrait orientation, and a dual landscape orientation. For example, FIG. 4a shows the trackpad with regions 402 represented according to the landscape orientation, and FIG. 4b shows the phone screen with regions 404 represented according to the portrait orientation.

Figure 5:
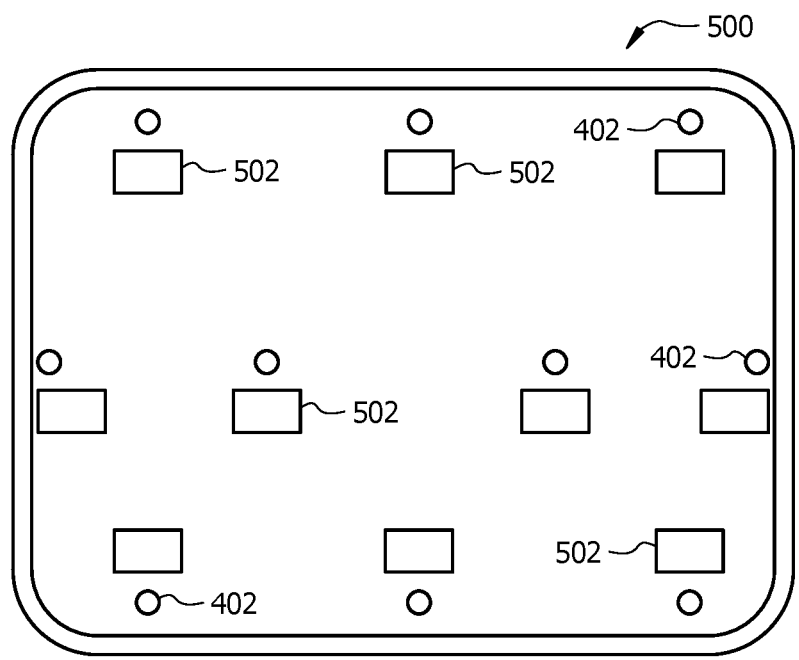
FIG. 5 shows a user interface displayed with text boxes representing virtual keys for each region, according to an embodiment.

At step 304, a plurality of virtual keys on the user interface 108 based on the selection of the multi-keypad configuration. Each virtual key may correspond to a corresponding region (402) and textbox (502). In an embodiment, after the division of the user interface 108 into the plurality of regions, each region may be associated with a virtual key. FIG. 5 shows an example of the user interface (trackpad 500) displayed with textboxes 502 representing virtual keys for each region 402. In an embodiment, one or more user interface widgets may be displayed for the plurality of virtual keys based on the identifier of the region 402/404 as textboxes 502. For example, the one or more user interface widgets may include text boxes and each text box may represent digits, numbers, characters, alphanumeric characters and combination thereof. In exemplary embodiments, each of the 10 regions 402 may be used to represent numbers 0 to 9 which users can select and configure. In an embodiment, the user may select any subset of virtual keys or any number of virtual keys or any virtual key during the configuration step. During this configuration step, a user first selects the number of keypads (regions and virtual keys) to configure, the keypad number (any one of 0-9) to configure and finally the user may assign numbers to the 10 regions or five regions or six regions or any number of regions based on user selection of regions. For example, the user may select only five out of 10 regions and virtual keys and the textboxes 502 of the selected regions may be activated and displayed for receiving user selection/assignment of numbers.

Figure 6:
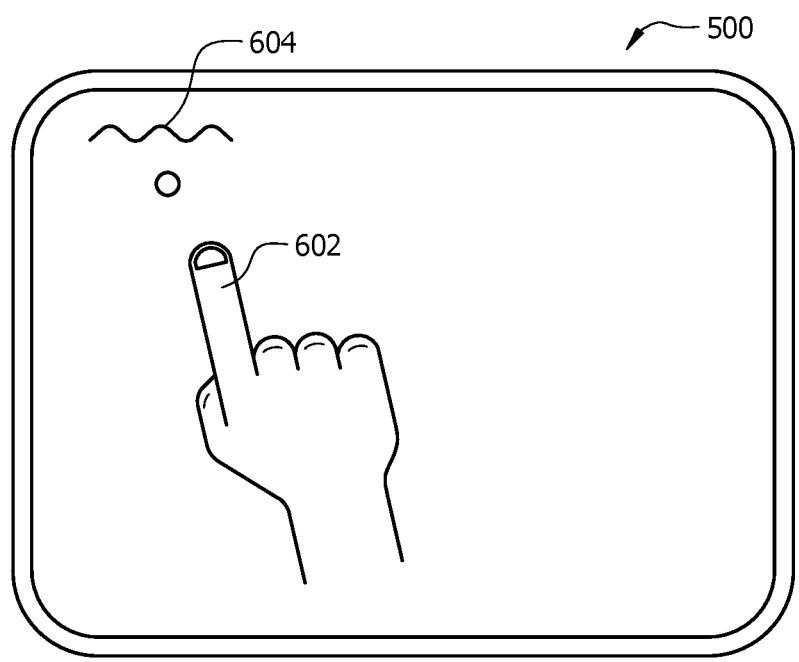
FIG. 6 shows an example of user tactile feedback from user touch gestures, according to an embodiment.

At step 306, user touch gestures are used to configure one or more of the plurality of virtual keys may be received or detected to generate a virtual keypad corresponding to the multi-keypad configuration. In an embodiment, the user touch gestures may include tactile force, tactile feedback and other kinds of user touch vibrations that may be detected by the user interface 108 of the electronic device 100. FIG. 6 shows an example of user tactile force 604 from the user touch gestures 602, according to an embodiment. In an embodiment, for each user touch gesture 602, the user interface may display or represent the tactile force 604 exerted through the user touch gesture 602 on the user interface 108. For example, FIG. 6 shows the representation of tactile force 604 on the trackpad. In exemplary embodiments, the trackpad may be divided into 10 regions 402 as represented by dots in FIG. 4. FIG. 5 represents the trackpad with 10 regions 402 on it. The dots represent the regions 402 and the rectangles represent the textbox 502 which allows user to assign numbers to the regions. FIG. 6 shows how a user may provide tactile force 604 depending on where the user may place their palm to indicate regions to which the user can assign numbers. On the display/screen, the corresponding textbox 502 gets activated to which users can assign numbers.

Figure 7:
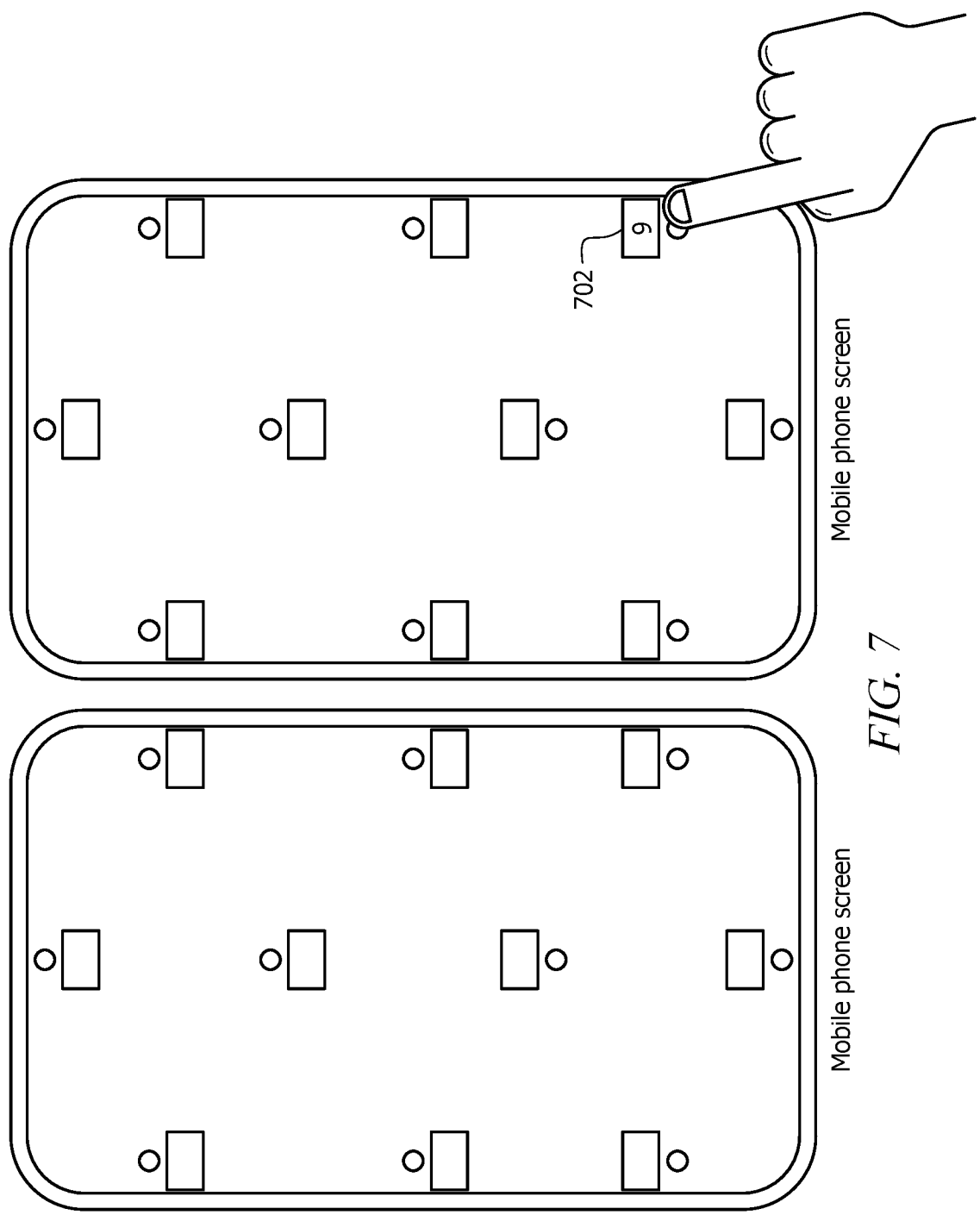
FIG. 7 depicts an example of assigning virtual keys to generate virtual keyboard, according to an embodiment.

With respect to step 306, FIG. 7 depicts an example of assigning virtual keys, for example, numbers to generate the virtual keyboard, according to an embodiment. FIG. 7 shows the mobile phone screen. The phone screen may be divided into 10 regions, the dots representing the center of the regions and rectangle representing the textbox. The user click or touches on the textbox and assign numbers to the corresponding regions. In FIG. 7, the image on the right shows the user selecting the bottom right textbox and assigning 9 to it as denoted by 702 when the user places the palm on the corresponding region. The user may assign virtual keys to all the regions or subset of regions or any region as per user selection of the regions.

Figure 8:
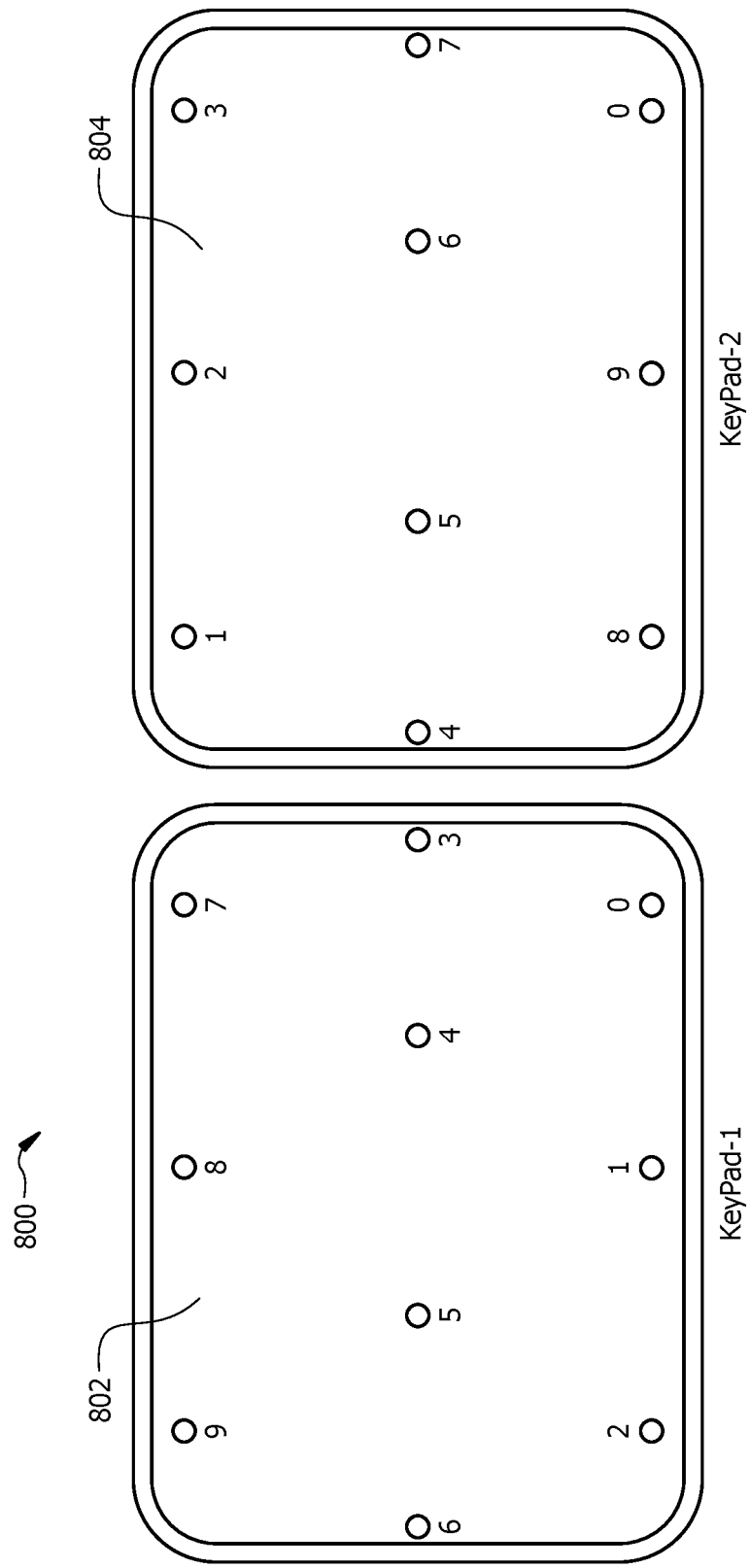
FIG. 8 depicts examples of one or more multi-keypad configurations, according to an embodiment.

When configuring the keypad in step 306, there may be multiple configurations. FIG. 8 depicts examples of one or more multi-keypad configurations that may be configured differently from one another. For example, keypad 1 shows a virtual keyboard 802 configured for the first multi-keypad configuration and keypad 2 shows a virtual keyboard generated or configured for the second multi-keypad configuration. In the configuration step, the user working on device having trackpad chooses to configure two keypads (two multi-keypad configurations). The user may be prompted to assign a number to each of the regions or dots which indicate the regions. The user may assign numbers 0 to 9 to each of the dots on one keypad configuration at a time. At the end of configuration step, the two keypads configured by the user might look as shown in FIG. 8. Once the configuration is complete, the user may perform input step related to setting a passcode using the virtual keyboard. The user may choose any number of points on the virtual keyboard as to set key points (passcode) and use the key points match against authentication key entered in the real time authentication process. For example, the key points may be 4-digits, 5 digits, 6 digits, or 8 digits (i.e., 4-digit password, 5-digit password or 6-digit password or 8-digit password) for use as authentication keys. In an embodiment, the key points can be set with a number, a digit, characters, alphanumeric characters and any combination thereof.

Figure 11:
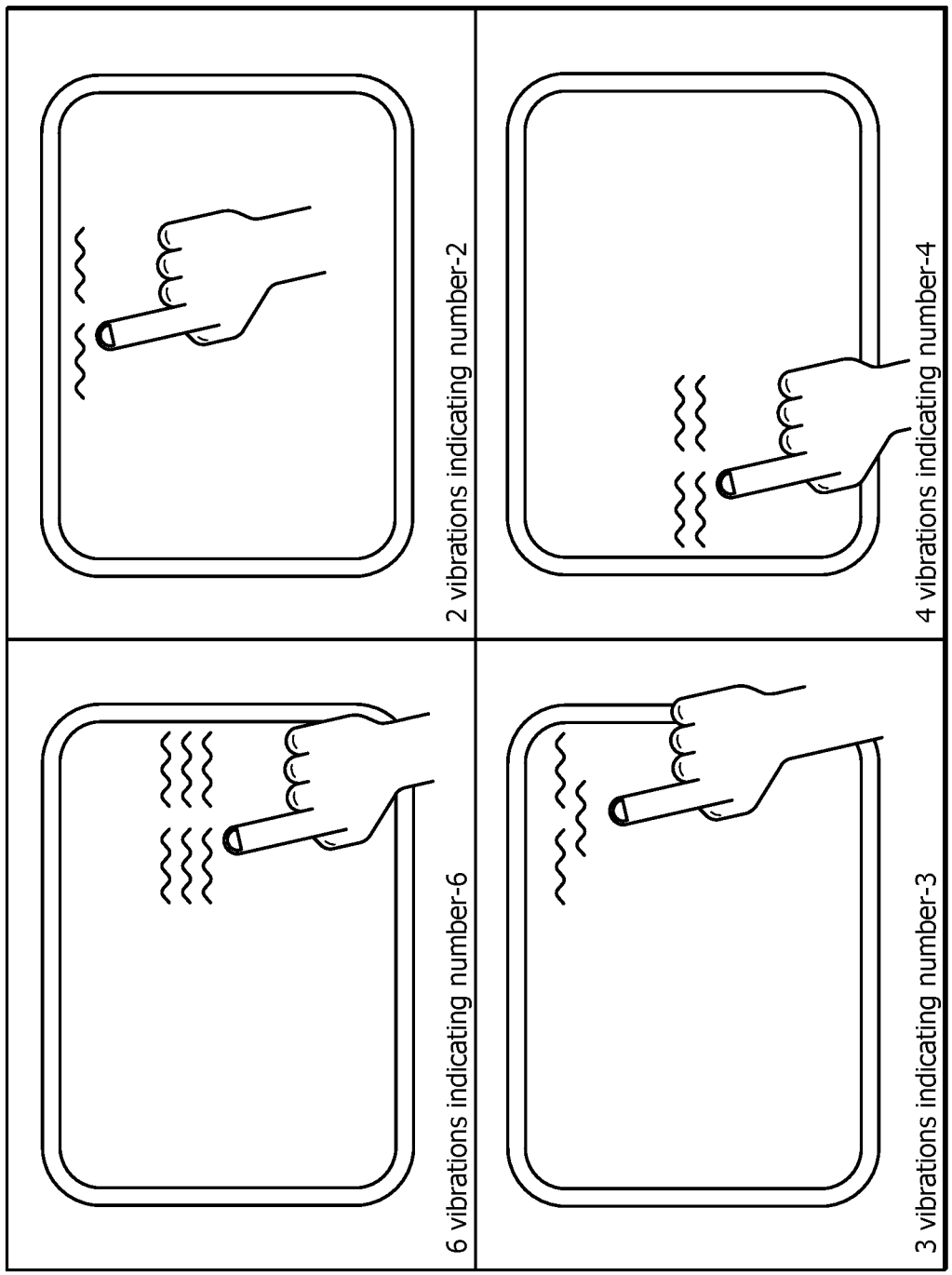
FIG. 11 depicts detection of user input gestures for entering authentication keys for authenticating a user, according to an embodiment.
Figure 12:
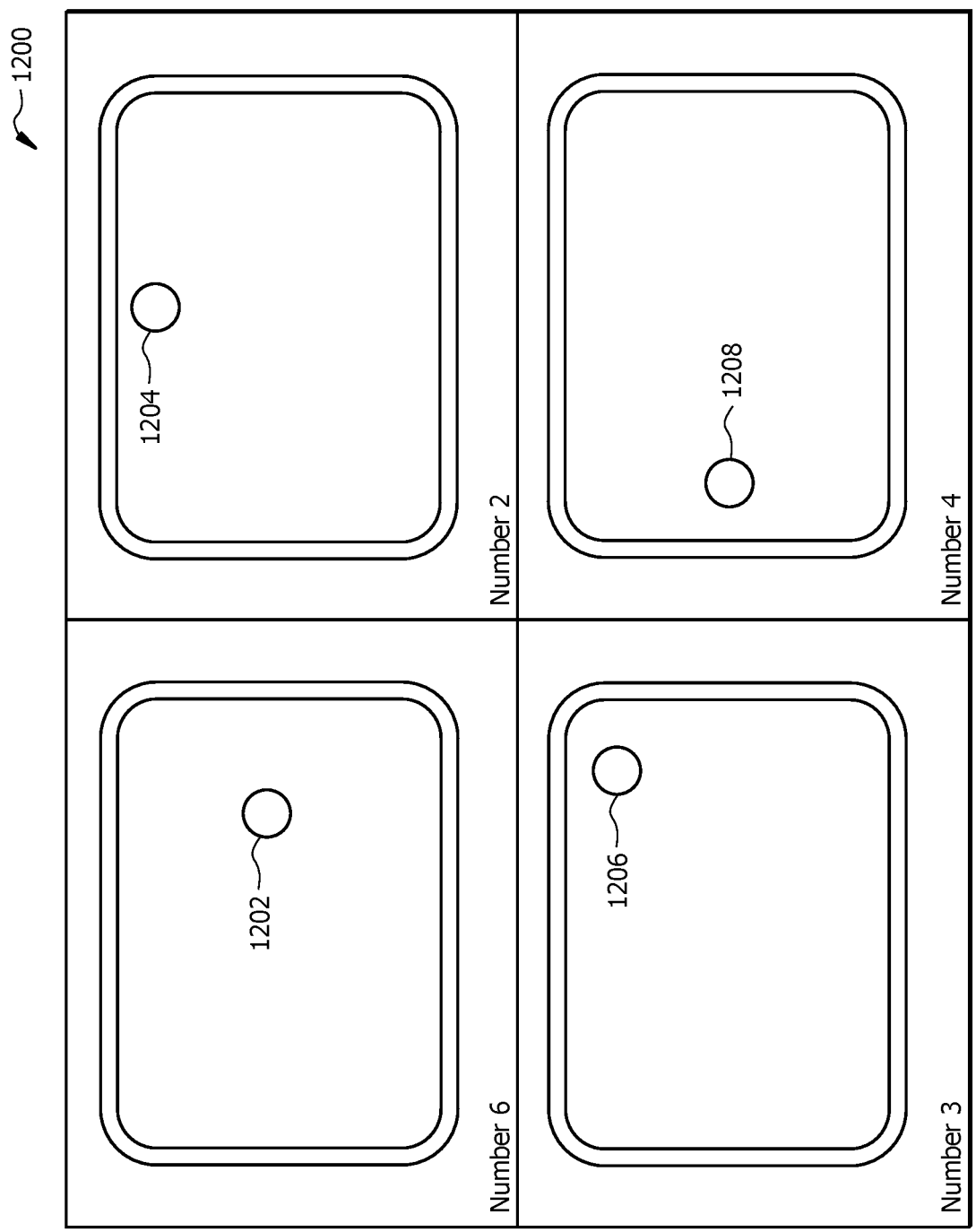
FIG. 12 illustrates an example of representing user input gestures into capacitive images for authenticating a user, according to an embodiment.
Figure 13:
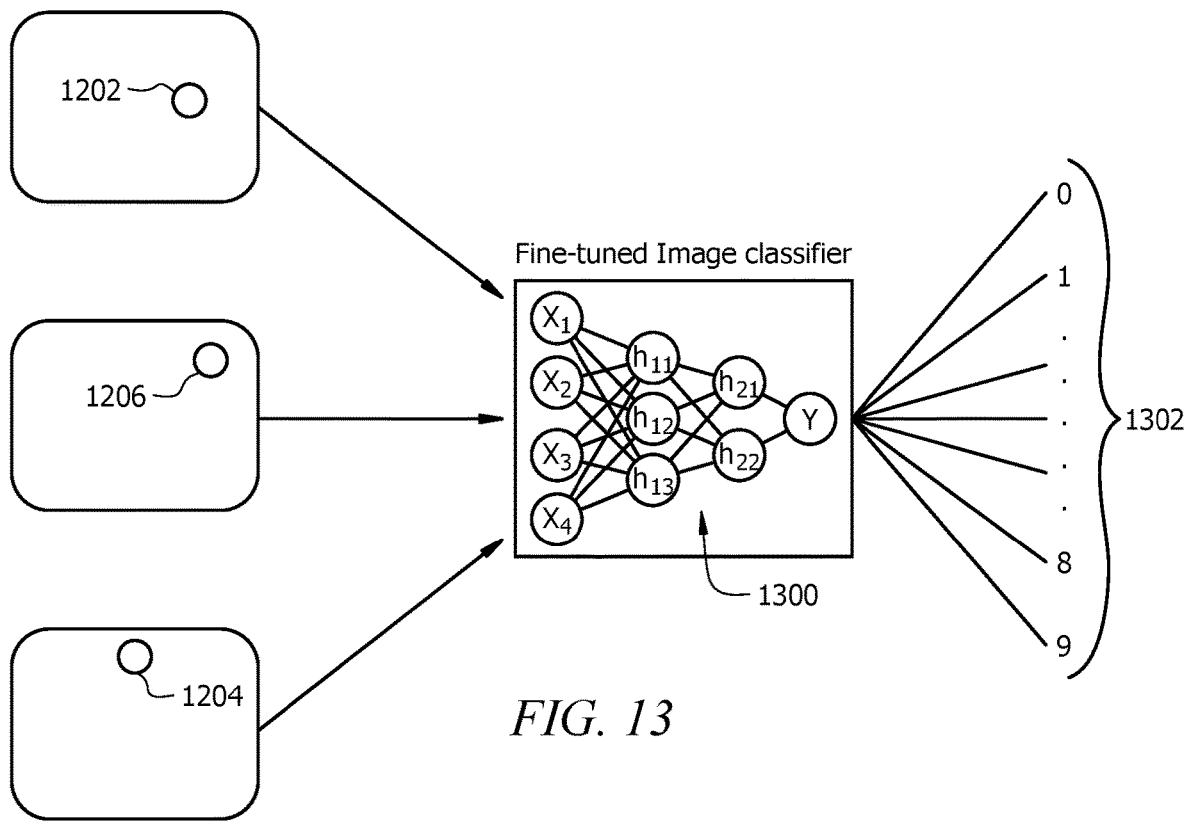
FIG. 13 illustrates an example of image classifier models, according to an embodiment.

In an embodiment, the user may touch the user interface 108 to set the key points for use as authentication keys. FIG. 11 depicts the detection of the tactile force 1100 for entering the password (key points 6, 2, 3, 4). The user touch may correspond to inputting the numbers by touching the regions corresponding to the number the user wants to enter and set the key points. In an embodiment, each key point (number) being entered may be represented with a number of vibrations on the user interface 108. The user interface 108 displays vibrations indicating each authentication key entered for each virtual key via the user input gestures. FIG. 11 shows the tactile force or vibrations corresponding to the user touch of the key points. The user may be provided feedback by the electronic device 100 through vibrations or tactile force (1100) with the number of vibrations indicating the number chosen. This ensures the user knows which number the user may be entering. When the user chooses to input 6, 2, 3, 4, the user may touch/click in the regions corresponding to these numbers as shown in image grid in FIG. 11. With each touch/click the electronic device 100 provides feedback to the user through vibrations indicating the number chosen. As shown in FIG. 11, entering of key point with 6 vibrations indicate number 6 being entered, entering of key point with 2 vibrations indicate number 2 being entered, entering of key point with 3 vibrations indicate number 3 being entered and entering of key point with 4 vibrations indicate number 4 being entered. For setting the key points, the user touch in selecting the digits for key points configuration (for use as authentication keys) may be converted into capacitive images. Each user touch in selecting digits (for example, in setting a 4-digit password) may be converted into a capacitive image. A spatial placement of the capacitive image on the user interface 108 may be determined. In an embodiment, the image classifier models 114 may be used to predict the key points and one or more regions, where the key points may be entered, based on the spatial placement of the capacitive image corresponding to each user touch. For example, the user chooses to set the 4-digit password with 6, 2, 3, 4 as 4-key points and the user inputs 6, 2, 3, 4 using user touch as shown in FIG. 11. The series of touches may be converted to four capacitive images 1202, 1204, 1206, 1208 as shown in the grid in FIG. 12 that illustrates an example of representing user input gestures 1200 into capacitive images 1202, 1204, 1206, 1208 corresponding to input numbers 6, 2, 3, 4. These images 1202, 1204, 1206, 1208 may be fed to a fine-tuned on-device image classifier 114 to predict the numbers user may have entered. In an embodiment, for better accuracy in predicting the input regions based on where the user touched, the touches (user input gestures) may be converted into capacitive images 1202, 1204, 1206, 1208. In an embodiment, the capacitive images may include a dot representing the area the user touched. These capacitive images may be used as input to the on-device image classifier models 114 (1300) as shown in FIG. 13. The on-device image classifier models 114 outputs/predicts the number the user entered based on the spatial placement of the dot(s) in the image. The use of on-device classifier 1300 ensures that user touch, the user input gestures, or any touch gestures may be learned continuously and regularly, to improve the model 114 further to help define region boundaries better. In an embodiment, the user may enter 6, 2, 3, 4 using the keypad 2 (804) configuration during real time authentication process.

At step 308, the generated virtual keyboard 802 configured with assignment of virtual keys may be detected by the electronic device 100. In an embodiment, the virtual keyboard 802, including the configuration of the one or more of the plurality of virtual keys, may be detected. In an embodiment, the virtual keyboard 804 configured as the second keypad configuration may also be detected.

At step 310, the memory 106 of the electronic device 100 may be updated and/or stored with the virtual keyboard(s) 802, 804 to activate it in real time to initiate user authentication according to the virtual keyboard. The memory 106 may also store the key points set by the user using the keypad configuration to use the key points to match against the authentication keys being entered during the authentication process.

Figure 9:
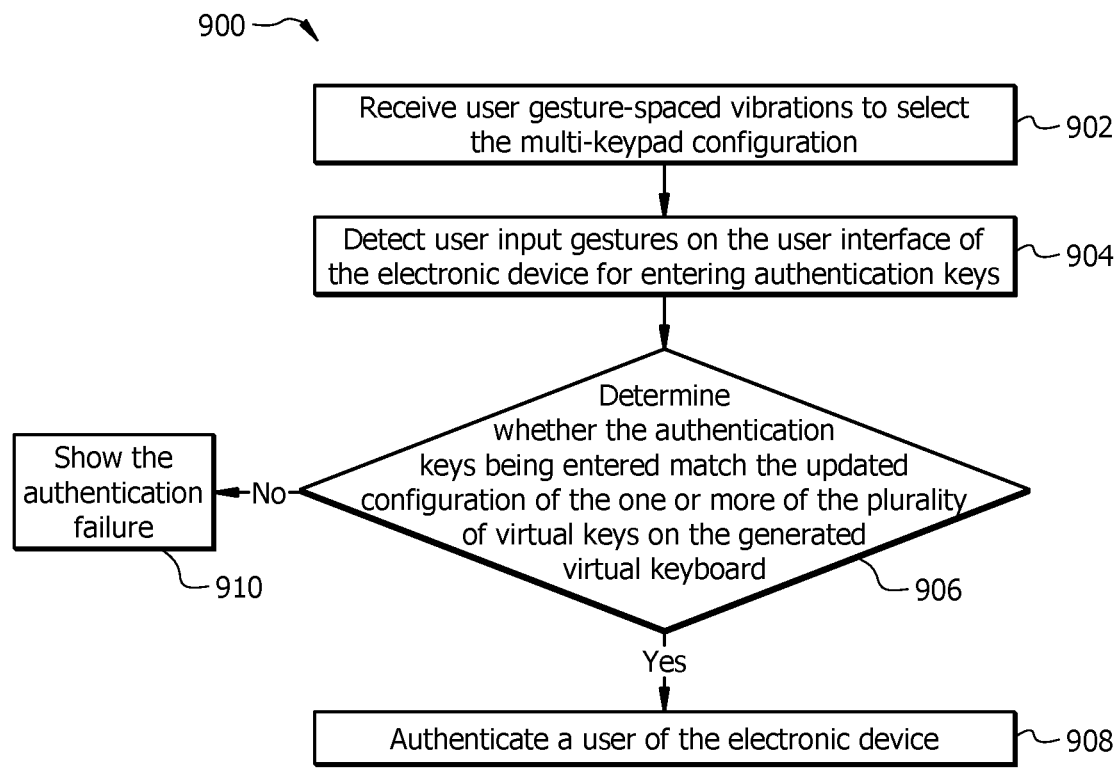
FIG. 9 depicts an example flowchart illustrating a method for authenticating a user using updated virtual keyboard, according to an embodiment.

FIG. 9 depicts an example flowchart illustrating a method for authenticating a user using updated virtual keyboard, according to an embodiment. Process 900 describes input steps for the user to initiate authentication process using the any multiple keypad configurations and the virtual keyboard generate application 102.

Figure 10:
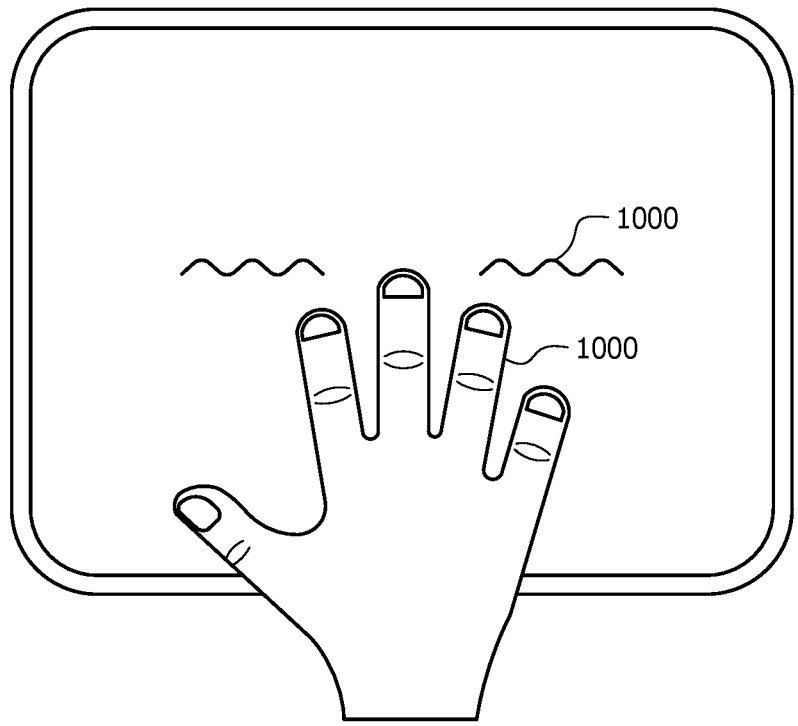
FIG. 10 shows user input comprising user gesture-spaced vibrations to generate multi-keypad configurations, according to an embodiment.

Process 900 begins at step 902, the electronic device 100 may receive and detect the user gesture-spaced vibrations to select one of the multi-keypad configurations. For example, the two keypad configurations (802, 804) in FIG. 8 may be used as reference to explain the authentication process. Once the configuration is complete in the configuration step as described in FIG. 3 with process 300, the user may activate any of the keypad configuration, for example, keypad 1 or keypad 2 with user gesture-spaced vibrations. At first the user may be indicated by the electronic device 100 to use tactile force which keypad configuration to use. For instance, two-spaced vibrations convey to the user that they must call, active and use keypad-2 configuration, three-spaced vibrations convey to call, activate and use keypad-3 configuration and so on. In the example instance, the user may choose to use keypad 2 (804 in FIG. 8) through two-spaced vibrations when the user touches the trackpad or phone screen as shown in FIG. 10. Upon receiving and detecting the user gesture-spaced vibrations corresponding to the selection of the one of the multi-keypad configurations at step 902, the selected keypad configuration (804) may be activated and conveyed to the user. For example, once the configuration is chosen, the user can enter the authentication keys (numbers) securely according to the keypad configurations (804).

At step 904, the user input gestures on the user interface 108 of the electronic device 100 for entering the authentication keys may be detected. For example, the user may choose to use the keypad 2 with virtual keyboard (804 during the configuration step). The user needs to enter the 4-key points, that was set during the configuration, as authentication keys (6, 2, 3, 4) in real time authentication process. FIG. 11 depicts the detection of the tactile force 1100 for entering authentication keys (6, 2, 3, 4). The user input gestures may correspond to inputting the numbers by touching the regions corresponding to the number the user wants to enter. In an embodiment, each authentication key (number) being entered may be represented with a number of vibrations on the user interface 108. The user interface 108 displays vibrations indicating each authentication key entered for each virtual key via the user input gestures. FIG. 11 shows the tactile force or vibrations corresponding to the user input gestures of the authentication keys. The user may be provided feedback by the electronic device 100 through vibrations or tactile force (1100) with the number of vibrations indicating the number chosen. This ensures the user knows which number the user may be entering. When the user chooses to input 6, 2, 3, 4, the user may touch/click in the regions corresponding to these numbers as shown in image grid in FIG. 11. With each touch/click the electronic device 100 provides feedback to the user through vibrations indicating the number chosen. As shown in FIG. 11, entering of authentication key with 6 vibrations indicate number 6 being entered, entering of authentication key with 2 vibrations indicate number 2 being entered, entering of authentication key with 3 vibrations indicate number 3 being entered and entering of authentication key with 4 vibrations indicate number 4 being entered.

In some embodiments, each user input gesture corresponding to the entering of the authentication keys may be converted into a capacitive image. A spatial placement of the capacitive image on the user interface 108 may be determined. In an embodiment, the image classifier models may be used to predict the authentication keys and one or more regions, where the authentication keys may be entered, based on the spatial placement of the capacitive image corresponding to each user input gesture. Continuing with the previous example where user inputs 6, 2, 3, 4 using user input gestures as shown in FIG. 11. The series of touches may be converted to four capacitive images 1202, 1204, 1206, 1208 as shown in the grid in FIG. 12 that illustrates an example of representing user input gestures 1200 into capacitive images 1202, 1204, 1206, 1208 corresponding to input numbers 6, 2, 3, 4. These images 1202, 1204, 1206, 1208 may be fed to a fine-tuned on-device image classifier 114 (1300) to predict the numbers user may have entered. In an embodiment, for better accuracy in predicting the input regions based on where the user touched, the touches (user input gestures) may be converted into capacitive images 1202, 1204, 1206, 1208. In an embodiment, the capacitive images may a dot representing the area the user touched.

These capacitive images may be used as input to the on-device image classifier models 114 (1300) as shown in FIG. 13. The on-device image classifier models 114 outputs/predicts the number the user entered based on the spatial placement of the dot(s) in the image. The use of on-device classifier 1300 ensures that user touch, the user input gestures, or any touch gestures may be learned continuously and regularly, to improve the model 114 further to help define region boundaries better.

At step 906, the process determines whether the authentication keys being entered match the sequence of key points in the virtual keyboard that was set during the configuration step with one or more of the plurality of virtual keys. If the authentication keys being entered match the key points (for example, 4-digit password), the user may be authenticated as denoted at step 908. If the authentication keys being entered do not match the key points (for example, 4-digit password), the user interface 108 presents authentication failure as denoted at step 910. In an embodiment, process includes updating and training the image classifier models 114 and region boundaries of the one or more regions of a plurality of regions based on the user input gestures and/or user touch (during configuration steps, user gestures for setting key points).

Figure 14:
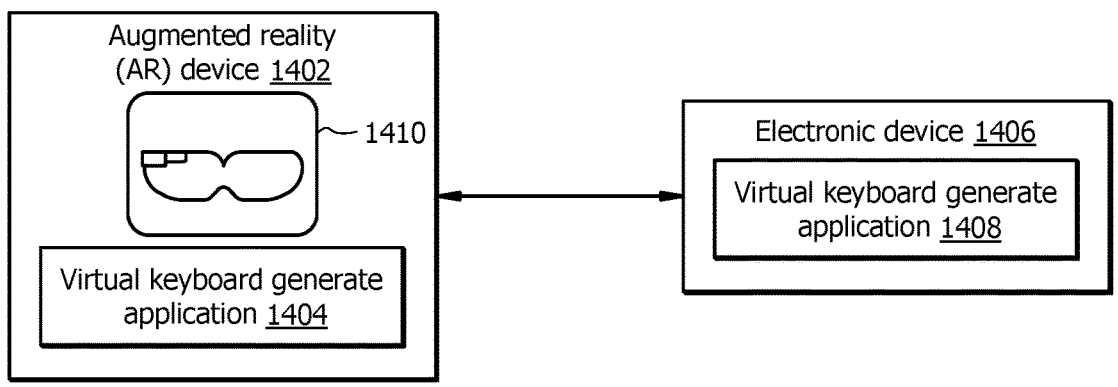
FIG. 14 illustrates an example of augmented reality (AR) device associated with a computing system, both installed with multi-factor keyboard generation application, according to an embodiment.

FIG. 14 illustrates an example of an AR device 1402 associated with an electronic device 1406 (electronic device 100/computing system 100), both installed with multi-factor keyboard generation application 102. In an embodiment, the electronic device 1406 may be the electronic device 100 from FIG. 1 and may perform operations of the electronic device 100. In an embodiment, the AR device 1402 may be installed with multi-factor keyboard generation application 1404 and electronic device 1406, similar to the electronic device 100, may include the multi-factor keyboard generation application 102 installed as 1408 in the electronic device 1406.

In an embodiment, the AR device 1402 may be associated with the electronic device 1406 through links and data communication networks enabling the users to access and interaction with the AR device. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular technology-based network, a satellite communications technology-based network, another link, or a combination of two or more such links. Links need not necessarily be the same throughout the system 100. One or more links may differ in one or more aspects from one or more other links.

Figure 16:
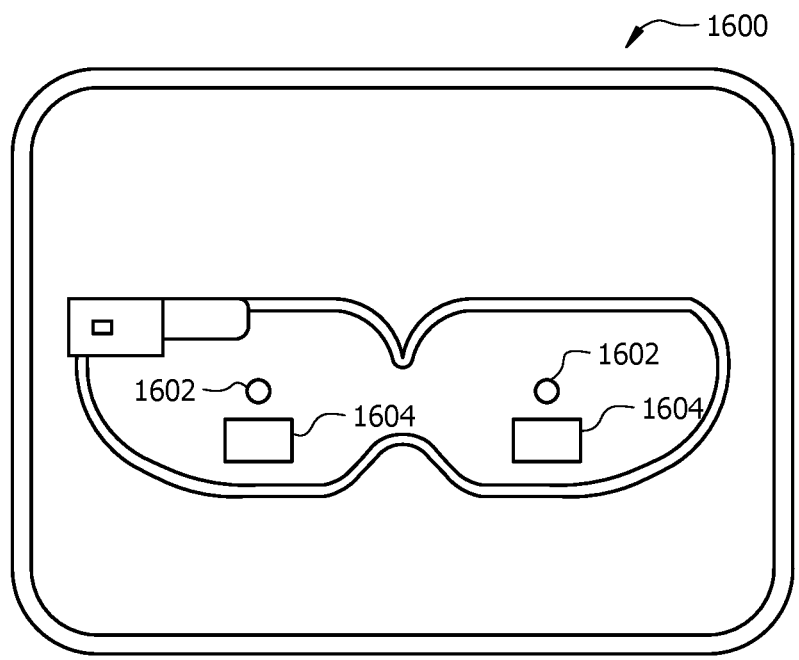
FIG. 16 illustrates mapping spatial distribution of each virtual key on the user interface to a display screen of AR device, according to an embodiment.
Figure 17:
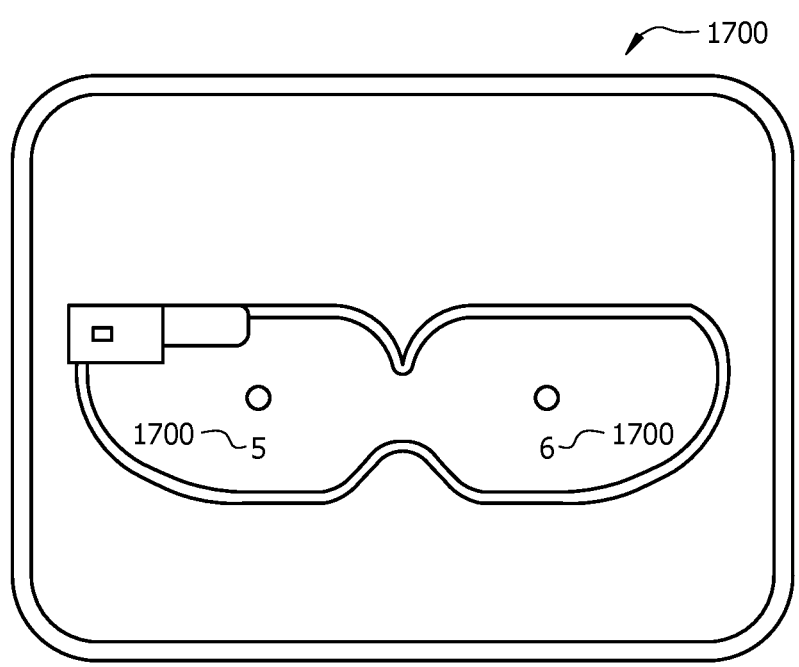
FIG. 17 depicts AR configuring inputs to configure a plurality of virtual keys to generate a virtual keyboard, according to an embodiment.

In an embodiment, the users accessing or using the AR devices 1402 including AR system, AR components, smart glasses or AR headset, etc., may be categorized as advanced users. The virtual keys, the virtual keyboard on the electronic device 1406 may be overlaid which may be visible only using the AR device 1402. For example, embodiments relate to overlaying numbers on the trackpad or mobile device which may visible only using Smart glasses/AR headsets as shown in FIG. 16 and FIG. 17 making configuration of keypads, setting of key points and entering of the authentication keys most secure.

Figure 15:
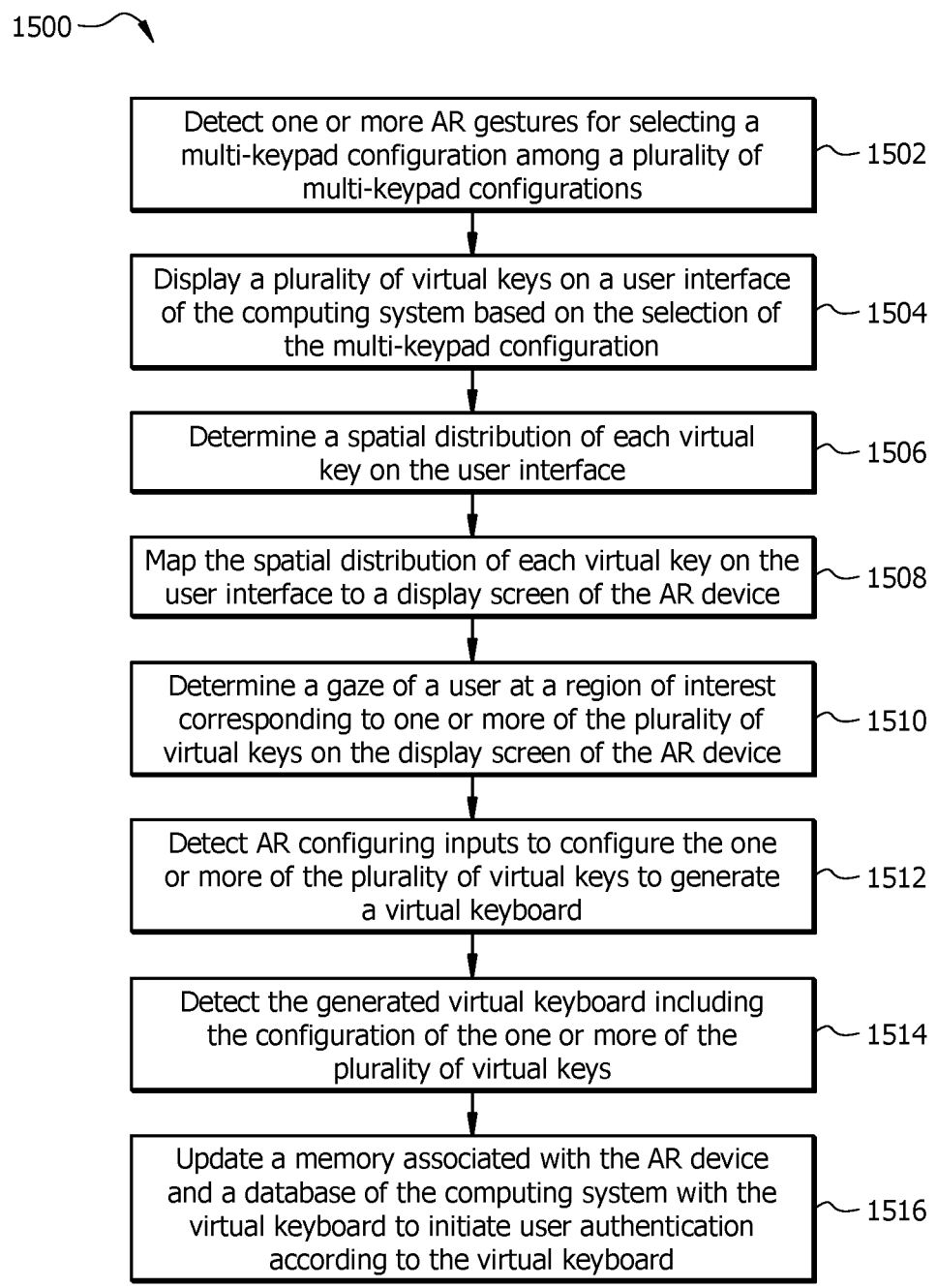
FIG. 15 depicts an example flowchart illustrating a method for generating a virtual keyboard via AR device, according to an embodiment.

FIG. 15 depicts an example flowchart illustrating a method for generating a virtual keyboard via the AR device 1402, according to an embodiment. Process 1500 describes the configuration steps using the AR device 1402, the user may look around or gaze around to see spatial distribution of the dots on the trackpad and the mobile phone screen. Using the gaze functionality provided by most AR headsets, the use gaze at a region to select the region and activate the corresponding textbox. Once the textbox may be selected the user is enabled to assign the required number as key points for use as authentication keys during real time authentication process via the AR device.

Process 1500 begins at step 1502 to detect one or more AR gestures for selecting a multi-keypad configuration among a plurality of multi-keypad configurations. For example, the on-device application 1408 and 1404 may provide five options of keypad configurations. The user may select each option at a time to configure the keypad or to generate virtual keyboards differently from one another with different keypad configuration options. In an embodiment, the selection of the multi-keypad configuration may be detected when the user provides user input including AR gestures. For example, the AR gestures include head gesture, hand gesture, voice gesture, finger taps, drag and drop movement, finger pinching, rotating movement, bloom gesture, resizing, selecting, moving, a natural language query, and any other kinds of AR-related commands. In an embodiment, each multi-keypad configuration after being configured with corresponding virtual keyboard via the AR device 1402 may be called upon using AR gesture inputs. For example, with one blink gesture, first keypad configuration may be activated, and the user may then input key points during the configuration (input step) of the key points and then needs to input authentication keys, same as key points, according to virtual keys set for the first keypad configuration. Similarly, with two wave gestures, second keypad configuration may be activated, and the user may then input digit keys during the configuration (input step) of the key points and then needs to input authentication keys, same as key points, according to virtual keys set for the second keypad configuration for authenticating the user in real time.

At step 1504, the AR device 1402 may be configured to cause display of the plurality of virtual keys on the user interface 108 of the electronic device 1406 based on the selection of the multi-keypad configuration. In an embodiment, the AR device 1402 may be configured to cause the electronic device 1406 to implement the functionalities and operation same as the electronic device 100 operations through sensing of the AR gestures from the AR device 1402.

At step 1506, the process determines a spatial distribution of each virtual key on the user interface of the electronic device 1406. For example, the user may look around to see the spatial distribution of the dots on trackpad and mobile phone screen.

At step 1508, the spatial distribution of each virtual key on the user interface may be mapped to the display screen 1410 of the AR device 1402. The plurality of virtual keys may be displayed on the display screen 1410 of the AR device 1402 based on the mapping. In an embodiment, the AR device 1402 including the display screen 1410 may be configured to map the orientation of the electronic device 1406 and division of the user interface 108 into various regions with dots, user interface widgets and textboxes to the display screen 1410 of the AR device. FIG. 16 illustrates mapping of the spatial distribution of each virtual key, the orientation of the electronic device 1406 and division of the user interface 108 into various regions with dots 1602, user interface widgets and textboxes 1604 onto the display screen 1410 of the AR device on the user interface to the display screen 1410 of AR device.

At step 1510, the process determines a gaze of the user's eye(s) at a region of interest corresponding to one or more of the plurality of virtual keys on the display screen 1410 of the AR device 1402. For example, the user may gaze at a region to select it and activate the corresponding textbox.

At step 1512, AR configuring inputs to configure the one or more of the plurality of virtual keys may be detected to generate a virtual keyboard. The AR configuring inputs may include selection of the textbox and assignment of numbers, characters, alphanumeric characters and combination thereof via the textbox. For example, Once the textbox is selected the user can assign the required number. The user may select any number of regions and assign virtual keys to all the regions or subset of regions or any region as per user selection of the regions. For example, the user may select only 5 regions through AR gestures and assign numbers to those selected 5 regions. The assignment of virtual keys to the regions may generate the virtual keyboard. FIG. 17 depicts AR configuring inputs to configure virtual keys (for example, numbers 5 and 6 for two regions) to generate a virtual keyboard, according to an embodiment.

At step 1514, the process detects the generated virtual keyboard including the configuration of the one or more of the plurality of virtual keys. For example, FIG. 8 depicts examples of keypad 1 showing a virtual keyboard 802 configured for the first multi-keypad configuration using the AR gestures and AR configuring inputs. Similarly, keypad 2 shows a virtual keyboard 804 being generated or configured for the second multi-keypad configuration using the AR gestures and AR configuring inputs. At the end of configuration step, the two keypads configured by the user might look as shown in FIG. 8. Once the configuration is complete, the user may choose any key points through AR gesture inputs for any region, for use as authentication keys in real time authentication process. For example, the user may either gaze to select the regions or touch the regions corresponding to the number the user wants to enter. In exemplary embodiments, the key points may be 4-digit keys, 5-digit keys or 6-digit keys or 8-digit keys (4-digit password, 5-digit password or 6 digit password or 8 digit password) for use as authentication keys. In an embodiment, the key points may include number, digit, characters, alphanumeric characters and any combination thereof.

At step 1516, memory associated with the AR device 1402 and a database of the electronic device 1406 (computing system) may be stored/updated with the virtual keyboard to cause setting the key points to use for user authentication. The memory may also store the key points keys set by the user using the keypad configuration to use the key points to match against the authentication keys being entered during the authentication process. In an embodiment, the machine learning models 110 and predictive models 112 may trained by learning the AR gestures, AR gaze, AR configuring inputs, AR gesture inputs applied during the configuring steps, setting the key points and authentication process. In an embodiment, the machine learning models 110 and predictive models 112 may trained continuously and regularly, to improve the models 110, 112 further to help determine the gaze and define region boundaries better.

During authentication process, a process may be implemented to authenticate the user. The process may include detecting AR gestures to select one of the multi-keypad configurations. For example, the two keypad configurations (802, 804) in FIG. 8 may be used as reference to explain the authentication process. Once the configuration is complete in the configuration step, the user may activate any of the keypad configuration via the AR gestures, for example, keypad 1 or keypad 2 with AR tap or blink or head gestures. Upon receiving and detecting the AR gestures corresponding to the selection of the one of the multi-keypad configurations, the selected keypad configuration (804) may be activated and conveyed to the user on the display screen 1410. For example, once the configuration is chosen, the user can enter the authentication keys (numbers) securely according to the keypad configurations (804). The user may provide AR input gestures for entering the authentication keys. For example, the user may choose to use the keypad 2 with virtual keyboard (804 that was set during the configuration step). The user needs to enter the key points, for example, 6, 2, 3, 4, as authentication keys in real time authentication process. The user may provide AR input gestures corresponding to inputting the numbers. The process may determine whether the authentication keys being entered via the AR gaze, gestures, hand movements match the sequence of key points in the virtual keyboard that was set during the configuration step. If the authentication keys being entered match the key points (for example, 4-digit password), the user may be authenticated. If the authentication keys being entered do not match the key points (for example, 4-digit password), the user interface 108 presents authentication failure as denoted. In an embodiment, process includes updating and training the machine learning models 110 and predictive models 112 by learning the AR gaze, AR input gestures configuring inputs, AR gesture inputs applied during the authentication process to help determine the gaze and define region boundaries better.

The embodiments allow users to input data on mobile phones and laptops using touch/tactile force for typical users and augmented reality for advanced users which is not only safe from observational attacks but is smart to adapt to users' behavior based on their usage.

Figure 18:
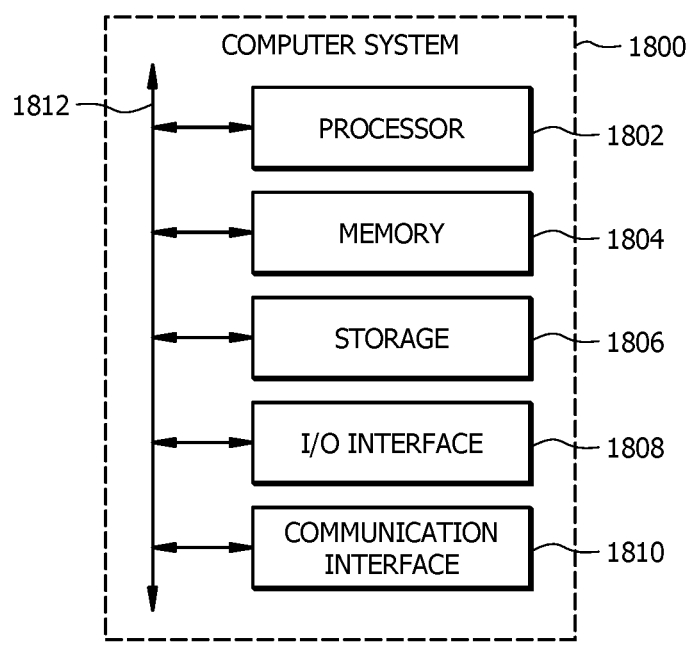
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide the functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memory 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for modifying a user interface of an electronic device, the method comprising:
    detecting, on the electronic device, a selection of a multi-keypad configuration among a plurality of multi-keypad configurations;
    displaying a plurality of virtual keys on the user interface based on the selection of the multi-keypad configuration;
    receiving, on the user interface, one or more user touch gestures to configure one or more of the plurality of virtual keys to generate a virtual keyboard;
    detecting the virtual keyboard including configuration of the one or more of the plurality of virtual keys; and
    updating memory of the electronic device with the virtual keyboard to initiate user authentication according to the virtual keyboard;
    wherein the selection of the multi-keypad configuration is detected based on a user input comprising a total number of user gesture-spaced vibrations.

2. The method of claim 1, wherein the selection of the multi-keypad configuration comprises:
    dividing the user interface into a plurality of regions, wherein each region is represented with an identifier.

3. The method of claim 2, further comprising division of the user interface into the plurality of regions according to an orientation of the electronic device, wherein the orientation comprising a portrait orientation, a landscape orientation, a dual portrait orientation, and a dual landscape orientation.

4. The method of claim 2, further comprising displaying one or more user interface widgets for each virtual key based on the identifier of a region.

5. The method of claim 1, further comprising:
    receiving the user gesture-spaced vibrations to select the multi-keypad configuration;
    detecting user input gestures on the user interface of the electronic device for entering authentication keys, wherein the user interface displays vibrations indicating each authentication key entered for each virtual key via the user input gestures;
    determining whether the authentication keys being entered match an updated configuration of the one or more of the plurality of virtual keys on the virtual keyboard; and
    in response to determining that the authentication keys being entered match the updated configuration of the one or more of the plurality of virtual keys on the virtual keyboard, authenticating a user of the electronic device.

6. The method of claim 5, wherein each authentication key being entered is represented with a number of vibrations on the user interface.

7. The method of claim 5, further comprising:
    converting each user input gesture into a capacitive image;
    determining a spatial placement of the capacitive image on the user interface; and
    using image classifier models to predict the authentication keys and one or more regions where the authentication keys are being entered based on the spatial placement of the capacitive image corresponding to each user input gesture.

8. The method of claim 7, further comprising updating and training the image classifier models and region boundaries of the one or more regions of a plurality of regions based on the user input gestures.

9. A computer system, comprising:
    a user interface;
    one or more processors; and
    one or more computer-readable non-transitory storage media in communication with the one or more processors and comprising instructions, that when executed by the one or more processors, are configured to cause the computer system to:
    detect a selection of a multi-keypad configuration among a plurality of multi-keypad configurations;
    display a plurality of virtual keys on the user interface based on the selection of the multi-keypad configuration;
    receive, on the user interface, one or more user touch gesture gestures to configure one or more of the plurality of virtual keys to generate a virtual keyboard;
    detect the virtual keyboard including configuration of the one or more of the plurality of virtual keys; and update memory of the computer system with the virtual keyboard to initiate user authentication according to the virtual keyboard;

wherein the selection of the multi-keypad configuration is detected based on a user input comprising a total number of user gesture-spaced vibrations.

10. The computer system of claim 9, wherein the instructions, when executed by the one or more processors, are further configured to cause the computer system to: divide the user interface into a plurality of regions, wherein each region is represented with an identifier based on the selection of the multi-keypad configuration.

11. The computer system of claim 9, wherein division of the user interface into a plurality of regions according to an orientation of the computer system, wherein the orientation comprising a portrait orientation, a landscape orientation, a dual portrait orientation, and a dual landscape orientation.

12. The computer system of claim 11, wherein the instructions, when executed by the one or more processors, are further configured to cause the computer system to:

display one or more user interface widgets for each virtual key based on an identifier of a region.

13. The computer system of claim 12, wherein the instructions, when executed by the one or more processors, are further configured to cause the computer system to:

receive user gesture-spaced vibrations to select the multi-keypad configuration;

detect user input gestures on the user interface of the computer system for entering authentication keys, wherein the user interface displays vibrations indicating each authentication key entered for each virtual key via the user input gestures;

determining whether the authentication keys being entered match an updated configuration of the one or more of the plurality of virtual keys on the virtual keyboard; and in response to determining that the authentication keys being entered match the updated configuration of the one or more of the plurality of virtual keys on the virtual keyboard, authenticating a user of the computer system.

14. The computer system of claim 13, wherein the instructions, when executed by the one or more processors, are further configured to cause the computer system to:

convert each user input gesture into a capacitive image;

determine a spatial placement of the capacitive image on the user interface; and use image classifier models to predict the authentication keys and one or more regions where the authentication keys are being entered based on the spatial placement of the capacitive image corresponding to each user input gesture.

15. The computer system of claim 14, wherein the instructions, when executed by the one or more processors, are further configured to cause the computer system to:

update and train image classifier models and region boundaries of the one or more regions of the plurality of regions based on the user input gestures.

16. The computer system of claim 15, wherein the instructions, when executed by the one or more processors, are further configured to cause the computer system to: represent a number of vibrations on the user interface to indicate each authentication key being entered.

17. One or more computer-readable non-transitory storage media including instructions that, when executed by one or more processors of a computer system, are configured to cause the one or more processors to:

detect, on the computer system, a selection of a multi-keypad configuration among a plurality of multi-keypad configurations;

display a plurality of virtual keys on a user interface based on the selection of the multi-keypad configuration;

receive, on the user interface, one or more user touch gestures to configure one or more of the plurality of virtual keys to generate a virtual keyboard;

detect the virtual keyboard including configuration of the one or more of the plurality of virtual keys; and update memory of the computer system with the virtual keyboard to initiate user authentication according to the virtual keyboard;

wherein the selection of the multi-keypad configuration is detected based on a user input comprising a total number of user gesture-spaced vibrations.

18. The one or more computer-readable non-transitory storage media of claim 17, further comprising sequences of instructions which, when executed by the one or more processors, cause the one or more processors to:

receive user gesture-spaced vibrations to select the multi-keypad configuration;

detect user input gestures on the user interface of the computer system for entering authentication keys, wherein the user interface displays vibrations indicating each authentication key entered for each virtual key via the user input gestures;

determine whether the authentication keys being entered match updated configuration of the one or more of the plurality of virtual keys on the virtual keyboard; and in response to determining that the authentication keys being entered match the updated configuration of the one or more of the plurality of virtual keys on the virtual keyboard, authenticating a user of the computer system.

19. The one or more computer-readable non-transitory storage media of claim 18, further comprising sequences of instructions which, when executed by the one or more processors, cause the one or more processors to:

convert each user input gesture into a capacitive image;

determine a spatial placement of the capacitive image on the user interface; and use image classifier models to predict the authentication keys and one or more regions where the authentication keys are being entered based on the spatial placement of the capacitive image corresponding to each user input gesture.

* * * * *